A. H. CRAWFORD.
Running-Gear for Vehicles.

No. 227,151. Patented May 4, 1880.

WITNESSES:
E. Laass
C. Bendixen

INVENTOR:
A. Herbert Crawford
per Duell, Laass & Hey, Attorneys.

UNITED STATES PATENT OFFICE.

A. HERBERT CRAWFORD, OF LIVERPOOL, NEW YORK.

RUNNING-GEAR FOR VEHICLES.

SPECIFICATION forming part of Letters Patent No. 227,151, dated May 4, 1880.

Application filed October 23, 1879.

*To all whom it may concern:*

Be it known that I, A. HERBERT CRAWFORD, of Liverpool, in the county of Onondaga, in the State of New York, have invented new and useful Improvements in Vehicles, of which the following, taken in connection with the accompanying drawings, is a full, clear, and exact description.

This invention relates to that class of vehicles which have both axles pivoted so as to swing in a horizontal plane, and connected with each other by diagonal perches, which compel the hind wheels to follow the track of the forward wheels.

The invention consists in the combination, with two axles, pivoted as aforesaid, of clips connected to the said axles and having clip-bars provided at one end with a thill-coupling and at the opposite end with an eye or pivotal hole, and the diagonal perches pivoted to the latter, by which improvement the construction of the said class of vehicles is materially simplified and cheapened and the variation in the distance between the centers of the two axles by the cramping thereof is lessened.

Figure 1:
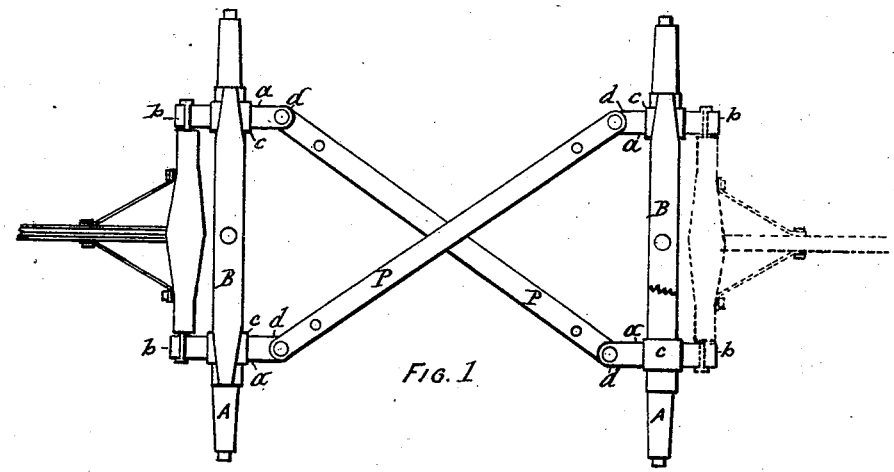
Figure 2:
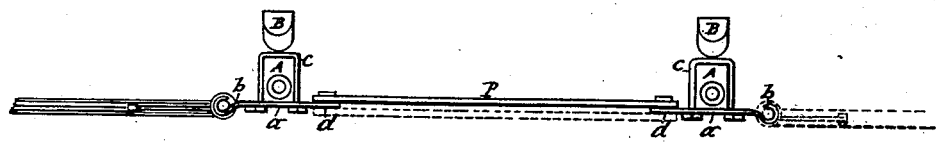

In the accompanying drawings, Figure 1 is a plan view of my invention, and Fig. 2 a side view of same.

Similar letters of reference indicate corresponding parts.

A A denote the two axles of the vehicle, represented as being composed of iron, with a wooden top piece secured thereto by clips $c$, embracing the said parts and clamped thereon by a clip-bar, $a$, applied to the under side of the iron axle, through which clip-bar the ends of the clip pass and are secured thereto by nuts in the usual manner. The clip-bar $a$ is provided at the outside of the axle with a suitable thill-coupling, $b$, for the attachment of a thill or tongue, and at the opposite side of the axle it is provided with a lug or short extension, $d$, having an eye or pivoted hole, to which is coupled the diagonal perch P, which, at its opposite extremity, is connected to a similar clip-bar, $a$, at the opposite end of the other axle. By connecting the perches to the axles in close proximity to the latter the said connections on each axle are brought nearly in line with the pivot of said axle, and thereby to a great extent prevent the distention and contraction of the distance between the centers of the two axles. Each of the axles being provided with the thill-couplings $b$ allows the tongue or thill to be attached to either end of the vehicle, which peculiar feature obviates the necessity of backing the vehicle out of places which do not admit of turning the vehicle around.

The two axles are pivoted to their respective bolsters B by a king-bolt, and thus admit of guiding the vehicle with equal facility in either direction, and the diagonal perches invariably compel the hind wheels to follow the track of the forward wheels.

Having thus described my invention, what I claim as new, and desire to secure by Letters Patent, is—

In combination with the axles A A, pivoted to their respective bolsters, the clips $c$, having their clip-bars $a$ provided at one end with the thill-coupling $b$ and at the opposite end with the coupling $d$, in close proximity to the axle, and the diagonal perches P P, pivoted to the said clip-bars, all constructed and combined substantially in the manner described and shown.

In testimony whereof I have hereunto signed my name and affixed my seal in the presence of two attesting witnesses, at Syracuse, in the county of Onondaga and State of New York, this 18th day of October, 1879.

A. HERBERT CRAWFORD.

Witnesses:
 E. LAASS,
 G. W. HEY.